United States Patent [19]

Fuhr et al.

[11] Patent Number: 4,837,276
[45] Date of Patent: Jun. 6, 1989

[54] PHOSPHORUS-CONTAINING OLIGOMERS AND POLYMERS CONTAINING POLYPHENYLENE ETHER BLOCKS AND MIXTURES OF OTHER PLASTICS THEREWITH

[75] Inventors: Karl Fuhr, Krefeld; Friedemann Müller, Neuss; Karl-Heinz Ott, Leverkusen, all of Fed. Rep. of Germany

[73] Assignee: Bayer Aktiengesellschaft, Leverkusen, Fed. Rep. of Germany

[21] Appl. No.: 138,215

[22] Filed: Dec. 28, 1987

[30] Foreign Application Priority Data

Jan. 7, 1987 [DE] Fed. Rep. of Germany ....... 3700208

[51] Int. Cl.$^4$ ........................ C07F 9/40; C08G 79/04; C08K 5/53
[52] U.S. Cl. ...................................... 524/125; 524/127; 528/128; 528/167; 528/169; 558/160; 558/162
[58] Field of Search ................ 524/125, 127; 558/460, 558/162; 528/128, 167, 169

[56] References Cited

U.S. PATENT DOCUMENTS

| | | | |
|---|---|---|---|
| 3,761,543 | 9/1973 | Gunsher | 558/162 |
| 4,046,724 | 9/1977 | Kato et al. | 524/127 |
| 4,154,771 | 5/1979 | Loucks et al. | 528/168 |
| 4,156,699 | 5/1979 | White | 528/168 |
| 4,419,299 | 12/1983 | Hefner | 558/162 |
| 4,521,584 | 6/1985 | Heitz et al. | 528/212 |

Primary Examiner—Veronica P. Hoke
Attorney, Agent, or Firm—Connolly and Hutz

[57] ABSTRACT

The invention relates to oligomeric and polymeric esters of difunctional polyphenylene ethers and phosphinic acids, phosphonic acids and phosphoric acid and to their use as a flame-retarding mixing component for other plastics.

14 Claims, No Drawings

PHOSPHORUS-CONTAINING OLIGOMERS AND POLYMERS CONTAINING POLYPHENYLENE ETHER BLOCKS AND MIXTURES OF OTHER PLASTICS THEREWITH

This invention relates to oligomeric and polymeric esters of difunctional polyphenylene ethers and phosphinic acids, phosphonic acids and phosphoric acid and to their use as a flame-retarding mixing component for other plastics.

Mixtures of monofunctional polyphenylene ethers with other plastics and low molecular weight phosphoric acid esters and halogen compounds are known. They are distinguished by compatibility and low combustibility (U.S. Pat. No. 3,639,506). Their disadvantage lies in a reduced deflection temperature under load and in the fact that certain constituents of the mixture tend to migrate.

Difunctional polyphenylene ethers and reaction products thereof with phosgene, terephthaloyl chloride and diisocyanates (DE-OS Nos. 3 300 792, 3 308 421) and with difunctional and trifunctional phosphorus compounds (DE-OS No. 2 823 167) are known. Without phosphorus, the materials have a high deflection temperature under load, but are readily ignitable and combustible. The disadvantage of known difunctional polyphenylene ethers lies in the fact that they are produced from monofunctional polyphenylene ethers by bonding with aldehydes or ketones (DE-OS No. 3 300 792) or quinones (DE-OS No. 2 823 167). Both processes provide only difunctional polyphenylene ethers of high molecular weight. However, low molecular weights are desirable in order to achieve relatively high phosphorus contents after reaction with phosphorus compounds.

The present invention relates to phosphorus-containing, oligomeric or polymeric esters corresponding to the following formula

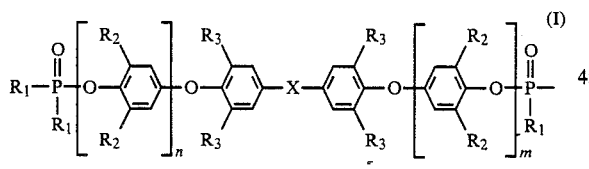

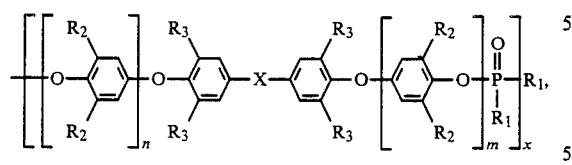

in which $R_1$, $R_2$ and $R_3$ independently of one another have the following meanings:

$R_1$ represents $C_1$-$C_8$ alkyl, $C_6$ aryl, $C_7$-$C_{20}$ aralkyl, $C_1$-$C_8$ alkoxy, $C_6$ aryloxy; aryl may even be substituted by $C_1$-$C_4$ alkyl or halogen (Cl, Br);

$R_2$ represents $C_1$-$C_4$ alkyl, $C_6$ aryl, halogen, such as Cl, Br, one $CH_3$ having to be present per phenyl ring, $R_3$ represents hydrogen, $C_1$-$C_4$ alkyl, $C_6$ aryl, halogen, such as Cl, Br, one $CH_3$ having to be present per phenyl ring X represents a

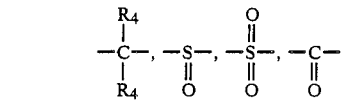

group, —O— or —S—and $R_4$ independently of one another represents hydrogen and $C_1$-$C_4$ alkyl and, together with the carbon atom to which they are attached, may form a $C_3$-$C_6$ ring, n and m independently of one another have the values 0, 1, 2, 3, 4, 5, 6 and 7, with the proviso that n and m cannot both have the value 0 and the sum (n+m) is no greater than 8, and x is an integer of from 1 to 50, preferably from 1 to 30 and more preferably from 3 to 10.

The oligomeric or polymeric esters according to the invention are obtained by reaction of dichlorides of phosphonic acids or of phosphoric acid monophenyl ester with polyphenylene ethers. The molecular weight may be regulated, for example, with chlorides of phosphinic acids or with monochlorides of phenyl esters of phosphonic acids or phosphoric acid.

The difunctional polyphenylene ethers corresponding to the following formula

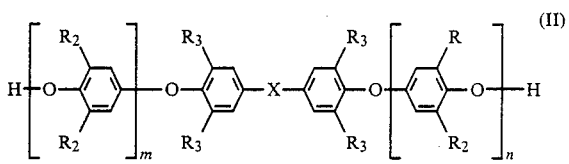

wherein $R_2$, $R_3$, X, n and m have the same meanings as in formula (I), which are used in the preparation of the compounds according to the invention are prepared by the process described in DE-OS No. 3 308 421: mixtures of phenols corresponding to the following formula

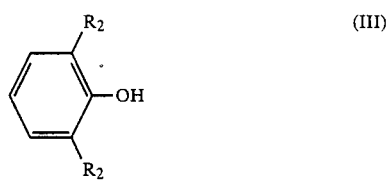

in which $R_2$ has the same meaning as in formula (I), for example 2,6-dimethylphenol, and bisphenols corresponding to the following formula

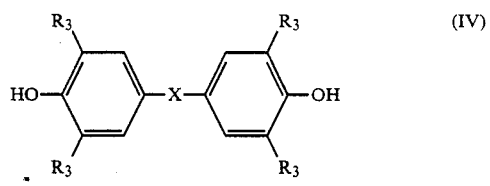

in which $R_3$ and X have the same meanings as in formula (I), for example 2,2-bis-:(3,5-dimethyl-4-hydroxyphenyl)-propane, are reacted with oxygen at −80° to 100° C., optionally under elevated pressure, in an organic solvent (for example chloroform) in the presence of a catalyst (for example copper chloride/4-dimethylaminopyridine).

In the preparation of the difunctional polyphenylene ethers by this method, the molecular weight may be varied within wide limits, i.e. may even be low, through the mixing ratio of monophenol to bisphenol. They may have molecular weights below 1500. After the reaction with phosphorus compounds, phosphorus contents of from 7 to 8% by weight may be achieved in this way. The compounds according to the invention in admixture with other plastics do not affect compatibility or the deflection temperature under load. They provide for distinctly reduced inflammability and combustibility. No constituents of the mixture migrate.

The polyesters according to the invention may be obtained by the following methods:

1. By reaction of the difunctional polyphenylene ethers with acid chlorides of phosphorus at temperatures of from 120° to 170° C. with elimination of hydrogen chloride, optionally in organic solvents, for example tetrachloroethylene.
2. By reaction of the difunctional polyphenylene ether salts (phenolates) with acid chlorides by the interfacial condensation method at temperatures of from −10° to 0° C., for example in water/methylene chloride (catalyst: cetyl trimethyl ammonium chloride).
3. By reaction of the difunctional polyphenylene ethers with phenyl esters of the above-mentioned acids of phosphorus at temperatures of from 200° to 300° C. under a pressure of from 0.01 to 0.1 bar with elimination of phenols in the presence of a catalyst, for example tin octoate.

Suitable monophenols are, for example, 2,6-dimethylphenol, 2-methyl-6-ethylphenol, 2-methyl-6-isopropylphenol, 2-methyl-6-phenylphenol, 2-methyl-6-methoxyphenol, 2,6-diethylphenol, 2,6-dichlorophenol and 2,6-dibromophenol. Suitable bisphenols are, for example, 2,2-bis-(4-hydroxyphenyl)-propane, 2,2-bis-(3,5-dimethyl-4-hydroxyphenyl)-propane, 2,2-bis-(4-hydroxyphenyl)-methane, bis-(3,5-dimethyl-4-hydroxyphenyl)-methane, bis-(4-hydroxyphenyl)-ether, bis-(4-hydroxyphenyl)-sulfide, bis-(4-hydroxyphenyl)-sulfone and 4,4-dihydroxybenzophenone. The production of the difunctional polyphenylene ethers is known (DE-OS No. 3 308 421).

Examples of phosphorus compounds suitable for use in accordance with the invention are the chlorides and phenyl esters of, for example, dimethyl phosphinic acid, methyl ethyl phosphinic acid, methyl phenyl phosphinic acid, diphenyl phosphinic acid, methyl phosphonic acid, phenyl phosphonic acid, benzyl phosphonic acid and phosphoric acid.

The present invention also relates to the use of the oligomeric or polymeric esters of acids of phosphorus with difunctional polyphenylene ethers as a flame-retarding additive in plastics. They may optionally be used together with other standard flame-retarding halogen-containing compounds and, optionally, another additive as synergists in a quantity of from 5 to 65% by weight, based on the mixture as a whole.

The present invention also relates to compositions containing a plastic, a phosphorus-containing ester of a difunctional polyphenylene ether according to the invention in a quantity of from 5 to 65% by weight, based on the mixture as a whole, and optionally a halogen-containing compound and optionally other additives, for example metal oxides.

Particularly suitable plastics are thermoplasts, such as polystyrene, co- and graft polymers with styrene, for example styrene/acrylonitrile copolymers, high-impact polystyrene, graft polymers of styrene, acrylonitrile and rubbers (of the ABS type), polyethylene, polypropylene, polyvinyl chloride, polyacrylate, polyesters, aromatic polycarbonate, polyamide, polyurethane polysulfone, polyphenylene oxide, polyphenylene sulfide or mixtures of these plastics, duroplastic plastics, for example of unsaturated polyester resins, epoxy resins and crosslinkable polyurethane raw materials.

In addition to the oligomeric or polymeric esters of formula (I) according to the invention, the compositions may contain other flameproofing agents and, optionally, such additives as fillers, pigments and reinforcing materials, for example glass fibers, and standard auxiliaries, for example heat stabilizers, light stabilizers, antioxidants, lubricants, mold release agents and dyes.

Examples of flameproofing agents are, for example halogen-containing flameproofing agents, such as hexabromobenzene, pentabromotoluene, octa- and decabromodiphenyl, octa- and decabromodiphenyl ether, hexabromo-bis-phenoxyethane, ethylene-bis-tetrabromophthalimide and mixtures thereof and also antidripping agents, for example polytetrafluoroethylene.

Synergistic metal oxides, for example antimony(III) oxide, lead(IV) oxide, cerium(IV) oxide, copper(II) oxide, molybdenum(VI) oxide, vanadium(V) oxide, bismuth(III) oxide, tungsten(VI) oxide, tin(IV) oxide and zirconium(IV) oxide and mixtures thereof may be added as further highly effective flameproofing agents.

Examples of typical fillers and pigments are glass beads, quartz powder, lime, chalk, light and heavy spar, aluminium hydroxide, aluminium oxide, magnesium and aluminium silicates, such as mica, talcum or kaolin, aluminium phosphate, calcium phosphate, zinc borate, zinc oxide, iron oxide, titanium dioxide, carbon, for example as graphite or carbon black, and fibrous materials, for example glass fibers.

EXAMPLE 1

151.1 g difunctional polyphenylene ether (OH number 129, molecular weight 870, 0.174 mole) are dissolved in 300 ml tetrachloroethylene and the resulting solution heated to reflux temperature (125° C.). 50 g ethyl methyl phosphinic acid chloride (0.395 mole) are added dropwise over a period of 1.5 hours. The reaction is over after 35 hours.

After cooling, the reaction is washed repeatedly with water until free from chloride, the solution is concentrated after drying with sodium sulfate and the solid obtained is dried in vacuo for 2 days at 80° C. The yield comprises 179.4 g or 98.3% of the theoretical. The product melts at around 128° C. (softening beyond 122° C). The phosphorus content is 5.6% by weight (theoretical 5.9% by weight).

To test the preparation described above for its flameproofing effect, 169.0 g are mixed together with 234.0 g octabromodiphenyl ether into 897.0 g of a typical ABS copolymer (Novodur PX(R), a product of Bayer AG) in a kneader at 200° to 220° C. 2.5 mm thick test specimens suitable for the UL test are then produced from the material obtained. In addition to 14.4% bromine, it contains 0.7% phosphorus. The UL test produces a rating of V-O.

EXAMPLE 2

168.7 g difunctional polyphenylene ether (OH number 131, molecular weight 844, 0.20 mole) are dissolved in 300 ml perchloroethylene and the resulting solution heated to reflux temperature (125° C.). 28.7 g phenyl phosphonic acid dichloride (0.15 mole) and 18.6 g methyl ethyl phosphinic acid chloride (0.15 mole) are added dropwise over a period of 1.5 hours. The elimination of hydrogen chloride stops after 40 hours, indicating that the reaction is over.

After cooling, the reaction mixture is repeatedly washed with water until free from chloride, the solution is concentrated after drying with sodium sulfate and the solid obtained is dried in a vacuum drying cabinet. The yield comprises 196.5 g or 99.7% of the theoretical. The product melts at around 140° C. The phosphorus content is 4.4% by weight (theoretical 4.6% by weight).

To test the preparation described above for its flameproofing effect, 195.0 g are mixed together with 234.0 g octabromodiphenyl ether into 871.0 of a typical ABS copolymer (Novodur PX$^{(R)}$, a product of Bayer AG) in a kneader at 200° to 220° C. 2.5 mm thick test specimens suitable for the UL test are prepared from the material obtained. In addition to 14.4% bromine, it contains 0.7% phosphorus. The UL test produces a rating of V-O.

We claim:

1. Oligomeric and polymeric esters corresponding to the following formula

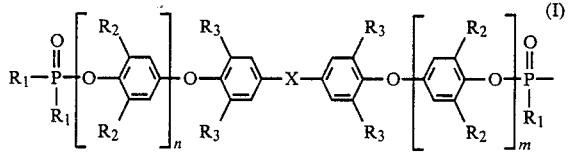

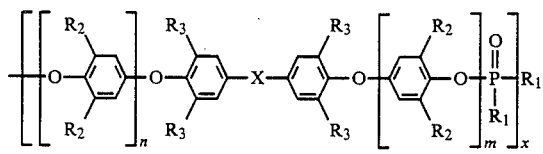

in which $R_1$, $R_2$ and $R_3$ independently of one another have the following meanings:

$R_1$ represents $C_1-C_8$ alkyl, $C_6$ aryl, $C_7-C_{20}$ aralkyl, $C_1-C_8$ alkoxy, or $C_6$ aryloxy;

$R_2$ represents $C_1-C_4$ alkyl, $C_6$ aryl, halogen, with one $CH_3$ having to be present per phenyl ring, $R_3$ represents hydrogen, $C_1-C_4$ alkyl, $C_6$ aryl, or halogen, with one $CH_3$ having to be present per phenyl ring, X represents a

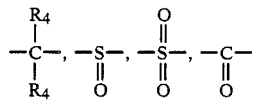

group, —O—, or —S—and $R_4$ independently of one another represent hydrogen and $C_1-C_4$ alkyl and, together with the carbon atom to which they are attached, form a $C_3-C_6$ ring, n and m independently of one another have the values 0, 1, 2, 3, 4, 5, 6 and 7, with the proviso that n and m cannot both have the value 0 and the sum (n+m) is no greater than 8, and x is an integer of from 1 to 50.

2. Oligomeric and polymeric esters as claimed in claim 1 wherrein $R_1$ is $C_6$ aryl, $C_7-C_{20}$ aralkyl or $C_6$ aryloxy wherein the aryl moiety of each is substituted by $C_1-C_4$ alkyl or halogen.

3. Oligomeric and polymeric esters as claimed in claim 1 wherein x is an integer from 1 to 30.

4. Oligomeric and polymeric esters as claimed in claim 3 wherein x is an integer from 3 to 10.

5. Oligomeric and polymeric esters as claimed in claim 1 wherein $R_2$ is methyl, $R_3$ is methyl and X is $(CH_3)_2-C<$.

6. Oligomeric and polymeric esters as claimed in claim 1 wherein $R_1$ is methyl, ethyl, or phenyl.

7. Process for preparing the esters as claimed in claim 1 which comprises reacting difunctional polyphenylene ethers with acid chlorides of phosphorus or pheny esters thereof.

8. Process for preparing esters as claimed in claim 7, characterized in that the difunctional polyphenylene ether used is prepared from 2,2-bis-(3,5-dimethyl-4-hydroxyphenyl)-propane and 2,6-dimethylphenol.

9. Process for preparing esters as claimed in claim 7, characterized in that methyl phosphonic acid dichloride either on its own or in admixture with methyl ethyl phosphinic acid chloride or reaction products thereof with phenol are used for the acid component.

10. Process for preparing esters as claimed in claim 7, characterized in that phenyl phosphonic acid dichloride either on its own or in admixture with methyl ethyl phosphinic acid chloride or reaction products thereof with phenol are used for the acid component.

11. Process for preparing esters as claimed in claim 7, characterized in that phosphorus oxychloride or its reaction product with phenol is used for the acid component.

12. Process for preparing esters as claimed in claim 7, characterized in that methyl ethyl phosphinic acid chloride or methyl ethyl phosphinic acid phenyl ester is used for the acid component.

13. In an improved composition comprising a plastic and a flame-retarding agent, the improvement comprises said flame-retarding agent being an oligomeric or polymeric ester according to claim 1 in quantities of from 5 to 65% by weight.

14. The improved composition according to claim 13 which additionally contains at least one synergistic metal oxide, other organophosphorus compounds, bromine-containing compounds or filler.

* * * * *